W. GEBHARDT.
PROCESS OF MAKING STOCK FOOD FROM CACTUS.
APPLICATION FILED MAY 20, 1918.
1,394,162.
Patented Oct. 18, 1921.
2 SHEETS—SHEET 1.
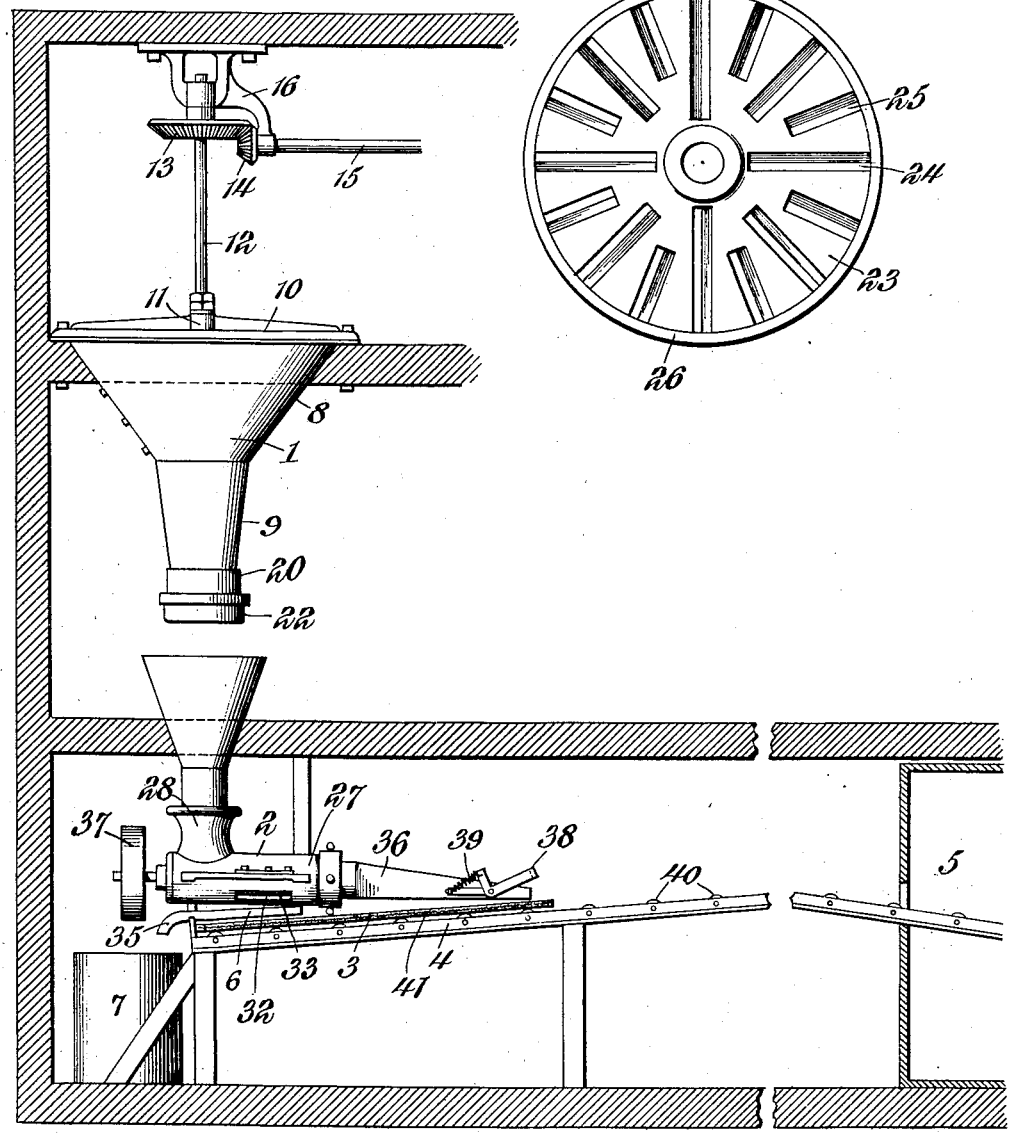
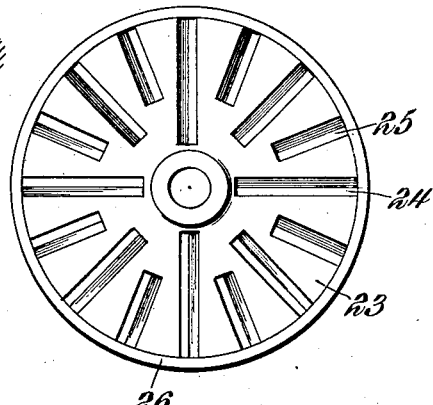
WITNESSES
Howard D Orr.
H. T. Chapman.
William Gebhardt, INVENTOR,
BY
ATTORNEY

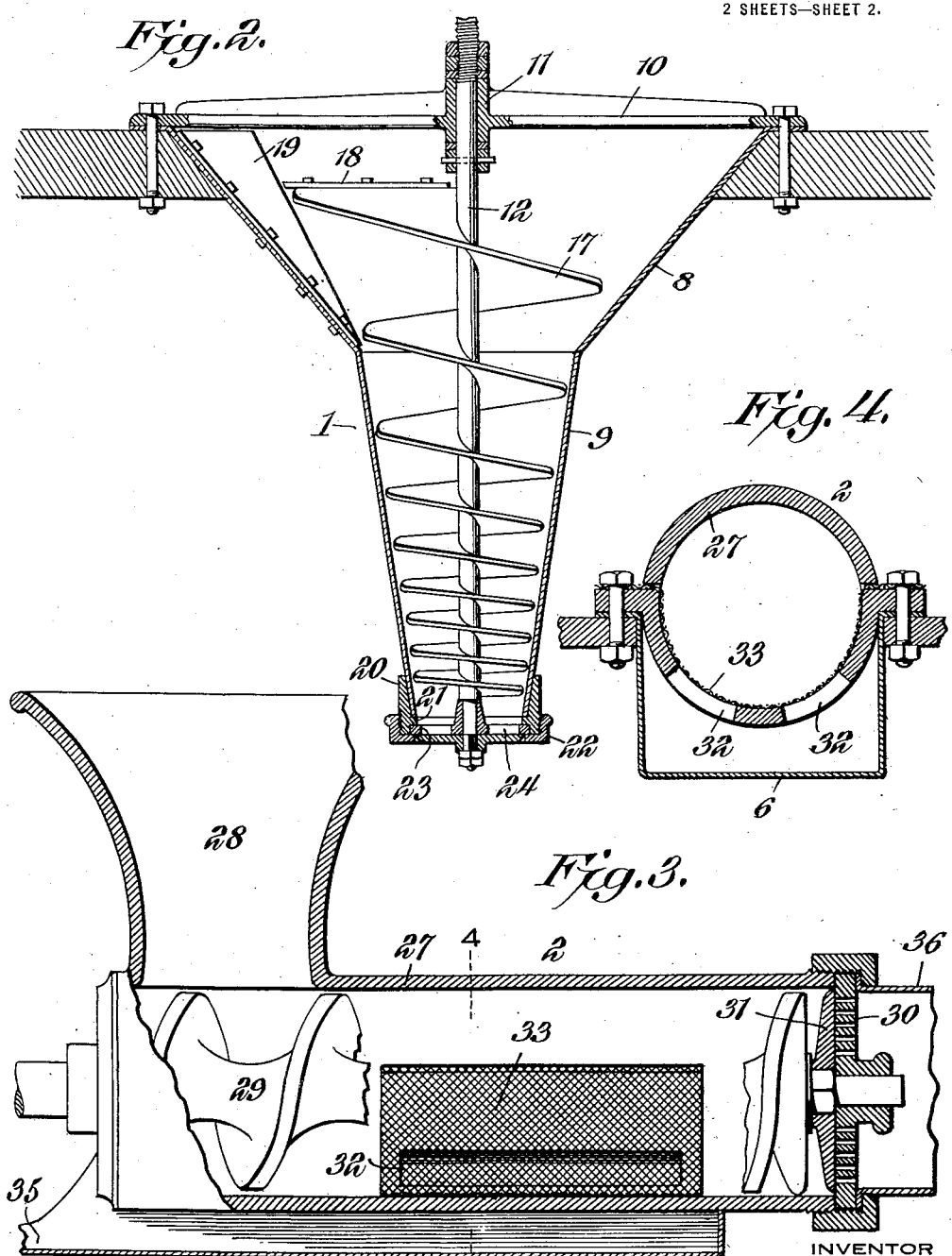

UNITED STATES PATENT OFFICE.

WILLIAM GEBHARDT, OF SAN ANTONIO, TEXAS.

PROCESS OF MAKING STOCK FOOD FROM CACTUS.

1,394,162.   Specification of Letters Patent.   Patented Oct. 18, 1921.

Application filed May 20, 1918. Serial No. 235,545.

*To all whom it may concern:*

Be it known that I, WILLIAM GEBHARDT, a citizen of the United States, residing at San Antonio, in the county of Bexar and State of Texas, have invented a new and useful Process of Making Stock Food From Cactus, of which the following is a specification.

This invention has reference to a process of making stock food from cactus, and its object is to produce a food from spiny cactus which will be free from harmful effects of either mechanical or chemical nature and by which there is provided a food capable of combination with other foods and also capable of being kept for indefinitely long periods without deterioration, the food produced by the process having a further advantage of retaining certain beneficial ingredients found only in the spines. In certain portions of the United States and Mexico immense quantities of cactus are available, but in the natural condition such cactus is not available for stock food because of the harmful spines which prevent cattle from eating the cactus, although the cattle will eagerly eat the material when the spines are removed, and, when such cactus denuded of the spines is mixed with other foods and fed to the cattle, the results obtained have been satisfactory, although not to as full an extent as would be desirable.

The usual procedure in preparing spiny cactus for stock food is to first burn off the spines with suitable apparatus while the plants are still standing, then cut down the plants and then feed such plants to the cattle. The cactus has the advantage of being of luxurious growth, easily obtainable and grown, and cheap. The usual procedure in preparing the cactus for cattle food, that is, by first burning off the spines, is harmful to the food value of the cactus, while there are certain ingredients of the cactus which seem to be more or less detrimental to the cattle.

In accordance with this invention certain beneficial elements, which are lost by the prevalent practice, are retained, and certain harmful ingredients, which have been found detrimental to the cattle, are discarded. Moreover, the product obtained is of a nature permitting it to be handled without harm, and while containing all the spines has the spines in such form as to be entirely harmless to the cattle. The product, being in a dry state, may be kept for long periods of time without deterioration. Furthermore, the process does not change the chlorophyl content of the cactus, the product still retaining the characteristic green color of chlorophyl.

The invention contemplates the use of the whole cactus plant, including the leaves and stems, cut off from the roots, since it is desirable to leave the latter in the ground for new growth. The plants are then placed in an apparatus which may be termed a reducer, whereby the cactus is cut up into relatively small particles and delivered into another apparatus which may be termed a pulping device, by means of which the cactus is reduced to a highly divided pulp and excess of liquid is discharged. It is desirable to have the pulp in the form of a rather thick gelatinous mass and so when the younger leaves are used wherein there is an excess of liquid which would tend to render the pulp too soft, such excess liquid is discharged. With older leaves the desired condition is obtainable without discharging any of the liquid contents. The pulp is deposited in a broad and relatively thin layer upon drying screens which may be placed in a suitable drying room where the temperature may be about 135° F. It is also possible to dry the pulp in the open air when atmospheric conditions permit.

It is advisable to subject the deposited pulp as quickly as possible to the action of a current of dry air so that the gelatinous matter which is present in the pulp hardens sufficiently to form a coating or crust which will exclude all matters liable to set up fermentation and will also preserve the chlorophyl and characteristics of the plant.

The liquid contents which are discharged during the pulping operation, appear to contain those ingredients of the cactus which, if the cactus be fed in large quantities for an extended length of time, seem to be harmful to cattle from a chemical standpoint. The pulping operation disintegrates the spines and renders them entirely harmless but these spines are retained in their entirety in the pulp. This is advantageous, since the spines appear to contain a large proportion of oil or material of an oily nature which is highly advantageous in cattle feed and which is wholly lost when the spines are burned off, the loss being augmented by the flames of the burners applied to the leaves in the burning procedure, thus causing a large loss of proteins and fats, as most of these materials are found in the outer skin of the cactus.

The process will be best understood from a consideration of the following detailed description taken in connection with the accompanying drawings, forming part of this specification and illustrating a form of apparatus by means of which the process may be practised, but the invention is by no means confined in its practice to the particular apparatus shown, since various other apparatus may be employed for the same purpose. Nor is the invention confined to any strict conformity with the procedure set forth but may be changed and modified so long as such changes and modification mark no material departure from the salient features of the invention as expressed in the appended claims.

In the drawings:—

Figure 1 is a view, generally in elevation, showing an apparatus by means of which the invention may be practised.

Fig. 2 is a vertical section through a reducing machine for cutting up the cactus into fine particles.

Fig. 3 is a longitudinal section, with some parts in elevation and other parts broken away, of a pulper, whereby the reduced cactus is converted into a pulp from which a certain percentage of the juice may be discharged.

Fig. 4 is a section on the line 4—4 of Fig. 3.

Fig. 5 is a plan view of a bottom member used in the structure of Fig. 2.

Referring to the drawings, and first to Fig. 1, there is shown a reducer 1, a pulper 2, a receiving screen 3 mounted to travel along a track or support 4, and ultimately leading into a drying room 5. The pulper 2 is underridden by a pan 6, for receiving the juice discharged from the pulper, and indicated as leading into a convenient tank 7 from which the juice may be withdrawn in any suitable manner. So far as the invention is concerned, such juice or liquid content of the cactus may be considered as a waste product, although, in practice, there are materials in such liquid that are worth saving and constitute by-product values.

The reducer 1 is shown more in detail in Figs. 2 and 3. The reducer is mounted in an upright position and comprises an upper funnel portion 8 and a lower neck portion 9 of taper conformation. At the top of the funnel is a spider 10 having at its center portion a bearing 11 for an upright shaft 12, which latter, as appears from Fig. 1, extends above the reducer and there carries a bevel gear 13 in mesh with which is a pinion 14 on a drive shaft 15, the shaft 12 and drive shaft 15 having journal bearings in a bracket 16 mounted on a suitable support.

The shaft 12 carries a conveyer blade 17 conforming generally to the funnel 8 and taper continuation 9. On the larger end of the blade 17 is a knife 18 and on one side of the interior of the funnel 8 is a back stop 19 constituting an abutment whereby the knife 18 may cut the cactus into small enough pieces to be readily forced by the blade 17 through the taper 9 toward the lower end of the reducer, at which point the reducer is surrounded by a ring 20 with an interior flange or shoulder 21 and threaded on the exterior for the reception of an internally threaded clamp ring 22. Between this clamp ring and flange or shoulder 21 there is secured a plate 23 shown separately in Fig. 5. This plate has a circular series of radial slots 24, 25 milled into its edge and these slots are diagonal to the faces of the plate so as to form effective cutting edges, whereby to reduce the material forced against them by the conveyer 17 to a finely divided state. The plate 23 is provided with a peripheral ring 26 shrunken thereon after the slots are milled into the edge of the plate and the plate is hardened. The back stop 19 which may be made of angle iron, is in the nature of a restrictor keeping the plants from being carried about the hopper and causing them to travel downwardly under the action of the conveyer, the plants being more and more compressed in their travel until, on passing through the plate 23, the cactus is cut into small pieces and gravitates or is discharged into the pulper 2 or pulpers, if more be used, and which may be arranged immediately beneath the discharge end of the reducer.

The pulper, as best shown in Figs. 3 and 4, comprises an elongated tubular body member 27 with a receiving hopper 28 at one end, shown in Fig. 1 as directly underlying the discharge end of the reducer. Within the body member 27 is a conveyer screw 29 of a character to force the reduced material from the hopper end of the pulper toward the other end thereof. At said last named end there is located a perforated plate 30 with the perforations large enough, say, about three-thirty-seconds of an inch in diameter, to prevent spines from choking them, and the spines may then be forced endwise through such openings or perforations. A knife 31 rotates with the conveyer 29 in contact with the plate 30 so as to shear off whatever passes through the plate, thereby reducing such material to a fine pulp. The bottom portion of the body 27 has passages 32 therethrough of relatively large size and these passages are covered on the inside of the body member by fine mesh screen 33 which may be made of wire of suitable gage with a mesh of suitable size. The purpose of the screen 33 is to permit liquid material, such as the discharged liquid contents of the cactus, to flow through it, but which will retain the more solid contents even though moist and of greatly reduced size. Underlying the passages 32 is the pan 6 which, as shown in Fig. 1, is provided with a spout 35 discharging into the receptacle 7 which latter may be taken as indicative of any suitable receptacle for the discharged liquid contents of the cactus. If it is not desirable to retain such discharged liquid it may be allowed to waste, and so far as the present process is concerned, may be considered as waste material. However, when the process is practised on a large scale such waste products may be treated for the recovery of values therefrom.

The conveyer 29 may be driven by a pulley 37, such pulley representing any suitable drive means. The discharge end of the body member 7, which end is that covered by the plate 30, is provided with a nozzle 36 so shaped as to have a considerable lateral spread with relatively small height and the nozzle at its discharge end is provided with a cutoff 38 normally held in the inactive position by a spring 39 but movable against the tendency of the spring to cut off the stream of pulp issuing from the nozzle.

The track 4, which may be provided with a series of rollers 40, is designed to support trays 3, each having a screen surface 41, in underriding relation to the discharge end of the nozzle 36.

Assuming that the structure is in operation the cactus plants already cut from the roots and conveyed to the reducer, and, if need be, cut into parts small enough to be fed into the reducer, are introduced thereinto to be further reduced by the knife 18 which rotates with the shaft 12. The conveyer 17 forces the material toward the discharge end of the reducer, thus being facilitated by the holding action of the retarder 19.

On leaving the reducer the cactus is in small enough pieces to be conveniently handled by the pulper of which a single machine, as illustrated in Fig. 1, may be used, or a battery of such machines may be readily fed by a single reducer, wherefore, the pulper shown in Fig. 1 may be taken as indicative of one or more such machines. The reduced cactus is then fed through the pulper and if there be an excess of liquid as occurs in young leaves, such liquid escapes through the screen 33 and openings 32 into the trough 6 to flow out through the spout 35 into the container 7 for future disposition. The pulp is forced through the plate or head 30 by way of the perforations which may be conveniently about three-thirty-seconds of an inch in diameter, such size being sufficient to permit the largest spines to pass through without liability of choking the passages. If the spines lie crosswise of these passages they are shredded up by the knife or cutter 31, or if they travel endwise through the passages then they are cut across into small particles by the knife or cutter 31. In either event the spines are contained in the pulp and pass therewith through the funnel 36 onto the screen trays 3 propelling these trays so that the pulp, which has considerable body, is deposited in a broad and relatively thin sheet upon each tray. When such a tray is filled the stream of pulp is cut off by the gate 38 permitting the removal of the filled tray and the substitution of an empty tray, whereupon, the filling of the next tray in order proceeds. The trays thus filled with the sheets of moist pulp are subjected to preliminary quick drying to cause the formation of the gelatinous skin, which latter is impervious to ferment germs and also prevents the escape of certain valuable contents or the change of character of the contents of the pulp. On placing the trays in a drying room under moderate temperature as before explained, or permitting the drying of the pulp in open air where the latter is dried and atmospheric conditions are proper the layer of pulp shrinks until ultimately is relatively thin and if protected from the effects of moisture will last indefinitely.

The dried sheets or cakes retain the greenish color of the live plant, since the chlorophyl of the plant is still present, and the cakes or sheets retain all the food values of the original plant without, however, possessing any of the harmful effects which have occurred from feeding cattle young green leaves over extended periods of time.

The dried cactus prepared in accordance with the invention may be used as a constituent of mixed feed to suit different conditions and to balance other ingredients of the mixed feed so that by properly proportioning the various ingredients of such mixed feed an ideal ration is obtainable with the proportions of ingredients changeable from time to time as may be found advisable to suit the cattle.

For some purposes the sheet or cake form of the product is well adapted for the purposes for which it is intended and may be broken up and mixed with other kinds of feed, or the cakes may be covered with molasses product such as the residue of molasses and sugar manufacture, a convenient mode of using the molasses being to coat the sheets or cakes with the molasses and stack the coated sheets into piles similar to bales.

For other purposes the cakes or sheets are reduced to dry powdered form and this powder is readily mixed with other feeds in proper proportions to provide a balanced ration, the cactus material being rich in certain ingredients and poor in others, while there are other feeds in which the materials are so proportioned that when mixed with the powdered cactus the various ingredients balance each other. Moreover, the powdered cactus will readily absorb water so that a mixed food containing the powdered cactus and water produces an ideal succulent food for stock.

What is claimed is:—

1. The process of preparing spiny cactus for stock food, which consists in reducing the green plant, including the spines, to a finely divided pulpy mass, with excess liquid, if present, removed, and then drying the pulp.

2. The process of preparing spiny cactus for stock food, which consists in reducing the green plant, including the spines, to a finely divided pulpy mass, with excess liquid, if present, removed, then spreading the pulp into thin layers and drying it.

3. The process of preparing spiny cactus for stock food, which consists in reducing the green plant, including the spines, to a finely divided pulpy mass, with excess liquid, if present, removed, then preliminarily drying the pulp to produce a gelatinous protective skin or envelop thereon, and finally completing the drying.

4. The process of preparing spiny cactus for stock food, which consists in gathering the whole plant, including the spines, above the roots, reducing the gathered plant to relatively small pieces, then pressing and cutting the reduced material into a finely divided pulpy mass, with excess liquid, if present, removed, then spreading the pulp into relatively thin layers, and finally drying the pulp.

5. The process of preparing spiny cactus for stock food, which consists in subjecting the whole plant above the roots, and including the spines, to the action of a reducer, whereby the plant is divided into relatively small pieces, then subjecting the reduced material to the action of pressure and at the same time subdividing it to produce a pulp, with excess liquid, if present, expressed, and finally drying the pulp.

6. The process of preparing spiny cactus for stock food, which consists in subjecting the whole plant above the roots, and including the spines, to the action of a reducer, whereby the plant is divided into relatively small pieces, then subjecting the reduced material to the action of pressure and at the same time subdividing it to produce a pulp, with excess liquid, if present, expressed, then forming the pulp into relatively thin layers and finally drying it.

7. The process of preparing spiny cactus for stock food, which consists in reducing the green plant, including the spines, to a finely divided pulpy mass, with excess liquid, if present, removed, drying the pulp, and reducing the dried pulp to powdery form.

In testimony that I claim the foregoing as my own I have hereto affixed my signature.

WILLIAM GEBHARDT.